July 27, 1965   D. E. LUPFER   3,197,138
METHOD OF AND APPARATUS FOR IMPROVED PROCESS CONTROL
Filed June 12, 1961   2 Sheets-Sheet 2
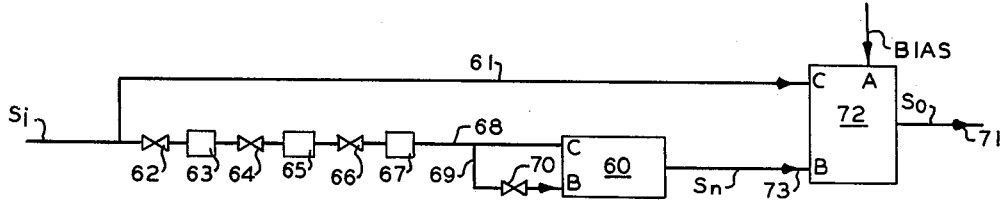
FIG. 6a
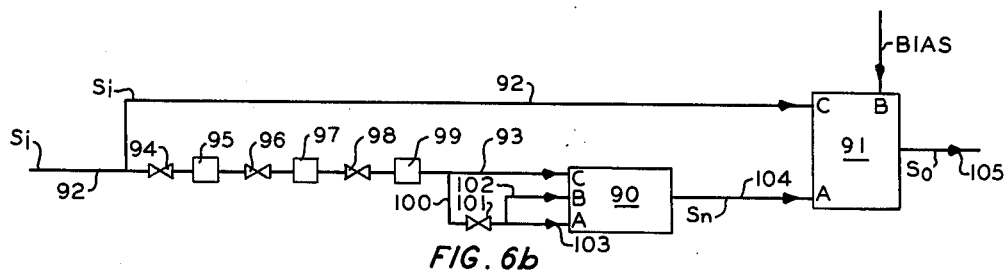
FIG. 6b
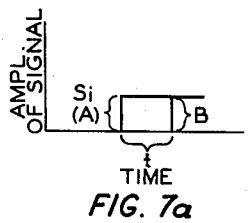
FIG. 7a
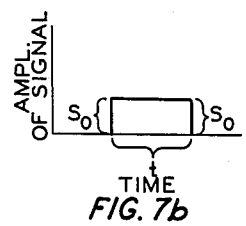
FIG. 7b
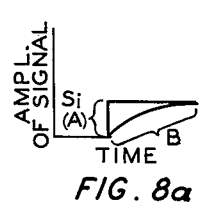
FIG. 8a
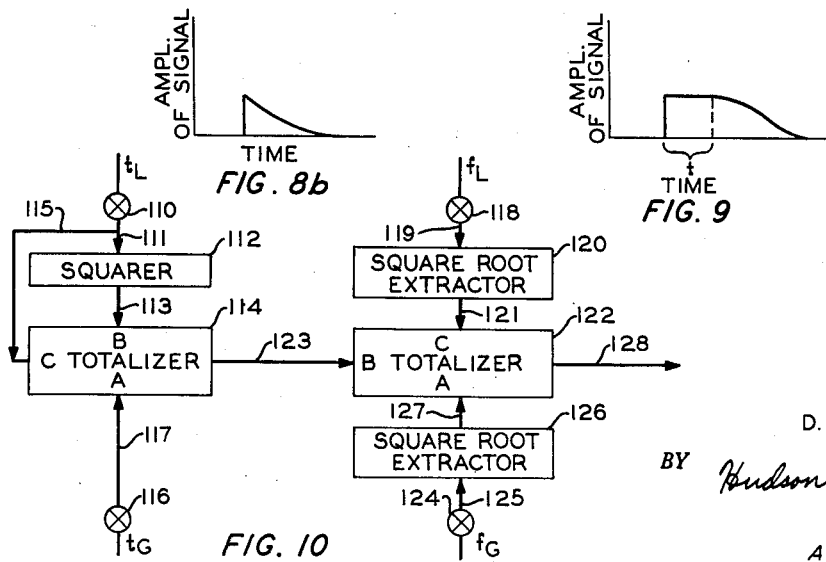
FIG. 8b    FIG. 9
FIG. 10
INVENTOR.
D. E. LUPFER
BY Hudson & Young
ATTORNEYS

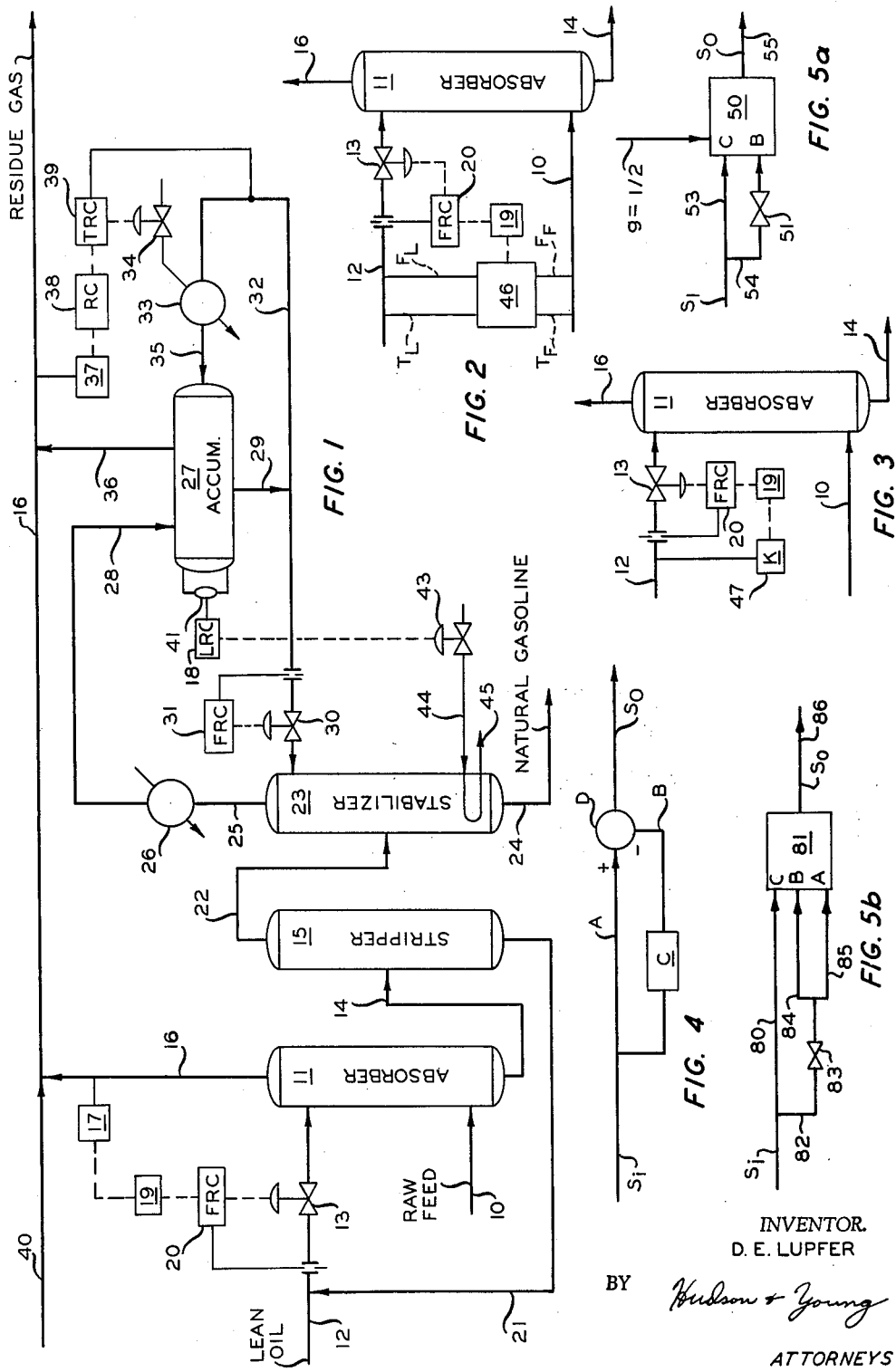

United States Patent Office 3,197,138
Patented July 27, 1965

3,197,138
METHOD OF AND APPARATUS FOR IMPROVED PROCESS CONTROL
Dale E. Lupfer, Bartlesville, Okla., assignor to Phillips Petroleum Company, a corporation of Delaware
Filed June 12, 1961, Ser. No. 116,580
4 Claims. (Cl. 235—200)

This invention relates to an improved method of and apparatus for controlling a process. In one specific aspect, this invention relates to an improved method of and apparatus for controlling a natural gasoline recovery process.

In a process control system wherein two or more variable conditions contribute to produce a single desired result, it is conventional to analyze the product, comparing said analysis with a desired result. A feedback control is then exercised on one of the variable conditions to thus adjust the process in order to produce said desired result. The process being controlled by a conventional feedback method of control is often of such a dynamic nature that poor results are obtained. Process dead time frequently is the cause of inadequate control. Dead time in a process can be defined as the time elapsed between the initiation of a change in the process and the detection of the effect of the change upon the process.

A typical process wherein conventional control systems are inadequate is in the recovery of natural gasoline. Hereinafter, the inventive control system will be discussed as it specifically applies to the recovery of natural gasoline and residual gas from a raw natural gaseous feed. But, of course, it will be understood by those skilled in the art that the principles applied herein are equally applicable to other process systems.

A conventional natural gasoline recovery process employs an absorption step wherein lean oil absorbs the natural gasoline from a raw natural gas feed. Natural gasoline is recovered from the rich oil by a distillation step and the stripped lean absorption oil recycled to the absorption step. The recovered natural gasoline is then deethanized or otherwise stabilized. Control of the conventional natural gasoline recovery process resides primarily in controlling the composition of the rich oil stream from the absorber and the composition of the natural gasoline recovered from the stabilizing step.

Broadly, I have discovered an improved method of and apparatus for controlling a process wherein the control system employs a shaped-pulse signal. I have further discovered a method of and apparatus for pneumatically simulating a first order dead time approximation and providing a shaped pulse. I have also discovered an improved method of and apparatus for controlling a natural gasoline recovery process wherein the control of said natural gasoline recovery process resides primarily in controlling the composition of the residue gas.

Accordingly, an object of this invention is to provide an improved method of and apparatus for controlling a process.

Another object of this invention is to provide a method of and apparatus for obtaining a shaped signal pulse pneumatically.

Another object of this invention is to provide a method of and apparatus for pneumatically simulating a first order dead time approximation.

Another object of this invention is to provide an improved method of and apparatus for controlling a natural gasoline recovery process.

Another object of this invention is to provide an improved method of and apparatus for controlling a natural gasoline recovery process wherein the absorption step is controlled by a feed-forward or predictive control method.

Other objects, advantages, and features of my invention will be readily apparent to those skilled in the art from the following description and appended claims.

FIGURE 1 is a schematic representation of one embodiment of the inventive control method.

FIGURE 2 is a schematic representation of another embodiment of the inventive method of controlling the absorber of FIGURE 1.

FIGURE 3 is a schematic representation of yet another embodiment of the inventive method of controlling the absorber of FIGURE 1.

FIGURE 4 is a schematic representation of the function of the shaped-pulse generator.

FIGURES 5a and 5b are diagrammatic representations of a pneumatic first order dead time approximation.

FIGURES 6a and 6b are diagrammatic representations of a pneumatic shaped-pulse generator.

FIGURES 7a and 7b are diagrammatic representations of an output pulse signal which results from a step input change for the circuit of FIGURE 4.

FIGURES 8a and 8b are diagrammatic representations of an input signal and an output signal of FIGURE 4, respectively, wherein a portion of the circuit of FIGURE 4 has a specific transfer function.

FIGURE 9 is a diagrammatic representation of an output response of FIGURE 4 circuit resulting from a step input change wherein a portion of the circuit of FIGURE 4 has yet another transfer function.

FIGURE 10 is a schematic representation of the computer of FIGURE 2.

Referring to FIGURE 1, a raw natural gas feed is introduced into absorber 11 by means of a conduit 10. Said natural gas feed is countercurrently contacted in absorber 11 with the lean oil feed passed to said absorber 11 by means of conduit 12 and valve 13. A rich oil stream is removed from absorber 11 and passed to a stripper 15 via conduit 14. An overhead residual gaseous stream is removed from absorber 11 by means of a conduit 16.

An analyzing means 17, such as a chromatographic analyzer and peak reader, is provided to determine the composition of the residual gaseous stream in conduit 16. As such analyzer 17 transmits a signal in response to the concentration of a constituent in the residual gaseous stream to a shaped-pulse generator 19, said shaped-pulse generator 19 hereinafter more fully described. A signal is transmitted from pulse generator 19 to a flow-recorder-controller 20 which in turn opens or closes valve 13 in response to the analysis of the residual gaseous stream in conduit 16. It is within the scope of this invention to measure other process variables indicative of the effectiveness of the absorption step, such as the composition of the rich oil stream and absorber pressure and to pass a signal representative of said measurement to generator 19. Although only one absorber is herein illustrated, it is, of course, within the skill of the art to control multiple absorbers operating in series, or in parallel, in a similar manner. Control of the lean oil rate of flow is herein illustrated; it is within the scope of this invention to also control other process variables of the absorption step such as the raw feed rate of flow.

Natural gasoline is separated from the absorption oil by distillation in stripper 15 and removed overhead from said stripper 15 by means of a conduit 22. A lean absorption oil stream is removed from the bottom of stripper 15 and recycled by means of conduit 21 to conduit 12.

A natural gasoline feed stream is passed to stabilizer 23 via conduit 22. Within said stabilizer 23, said natural gasoline is deethanized, or otherwise stabilized, and withdrawn from the bottom of stabilizer 23 via conduit 24. A residual gaseous stream is removed from the top of stabilizer 23 by means of a conduit 25 and passed to a means of condensing said residual vapors, such as a condenser 26. The condensed vapors are passed from condensing means 26 via conduit 28 to an overhead accumulator 27.

A portion of the condensed overhead vapors is passed from accumulator 27 to stabilizer 23 as reflux via conduit 29. The reflux rate is controlled by means of a conventional flow-recorder 31 opening or closing valve 30. The remainder of the condensed vapors is withdrawn from accumulator 27 and recycled to said accumulator 27 via conduit 29, conduit 32, heat exchange means 33, and conduit 35. At least a portion of the recycled condensed vapors are vaporized by heat exchange means 33, the rate of vaporization determined by the opening or closing of valve 34. Vapors are passed from heat exchange means 33 to accumulator 27 via conduit 35 and removed from accumulator 27 via conduit 36. The vapors flowing through conduit 36 are combined with the residue gas flowing through conduit 16 at the point of communication (contact zone) between conduits 16 and 36.

Stabilization within stabilizer 23 can be controlled, for nal is transmitted from liquid level sensing means 41 to a liquid level in accumulator 27, said liquid level determined, for example, by a liquid level sensing means 41. The signal is transmitted from liquid level sensing means 41 to a conventional liquid level-recorder-controller 18 which in turn opens or closes valve 43 in response to the liquid level in accumulator 27.

The composition of the combined residual gaseous stream in conduit 16 is determined by analyzing means 37, such as a chromatographic analyzer. Analyzing means 37 transmits a signal representative of the composition to a conventional recorder-controller 38. Recorder-controller 38 compares the signal received from analyzing means 37 with a set point representative of the desired composition and transmits a signal to a temperature-recorder-controller 39 which in turn opens or closes valve 34 in response to the composition of the residual gaseous flow in conduit 16.

Although not necessary to the inventive control method, an additional advantage of the inventive method of control is apparent when it is desired to combine a third gaseous stream received from a second natural gasoline recovery process with the residual gaseous stream from absorber 11 and accumulator 27 to thus blend three residual gaseous streams to produce a combined residue gas of controlled composition, said third gaseous stream passed to conduit 16 by means of conduit 40.

The composition of the combined residual gaseous stream in conduit 16, in the natural gasoline recovery process of FIGURE 1, is affected by severe transients revolving about the absorption step of the process. A transient can be defined as a change from a steady state operation. A steady state operation is an operation wherein the process or operation is maintained undisturbed. For example, a decrease in the temperature of the absorber lean oil feed, with all other variables remaining constant, will increase the absorption capacity of absorber 11, and thus decrease the flow of residue gas from the absorber. Assuming that it is desirable to produce a residue gas of constant heating value, then the heating value of the combined residual gaseous stream will be reduced with the lower lean oil temperature. The temperature of the raw natural gas feed, and the flow rate of the lean oil and the natural gas raw feed, are also important in determining the heating value of the residual gaseous stream flowing from absorber 11. The relative importance in relation to the inventive control system will hereinafter be more fully discussed.

An increase in the flow of enriching residue gas from accumulator 27 will raise the heating value of the combined residual gaseous stream in conduit 16. The heating value of the combined residual gaseous stream from the natural gasoline recovery process can, therefore, be controlled by adjusting the flow of residue gas from absorber 11 and accumulator 27 with the lowest heating value obtainable determined by the heating value of the residue gas flowing from absorber 11.

A disadvantage of conventional feedback control systems employed to produce a residual gaseous stream of constant heating value is readily apparent when reference is made to FIGURE 1. In a conventional control system the heating value of the combined residual gaseous stream flowing in conduit 16 would be determined by an analyzing means 37 such as a Cutler-Hammer calorimeter described in Cutler-Hammer Bulletin 99001. In response to said determination, temperature-recorder-controller 39 would open or close valve 34, thus increasing or decreasing the flow of enriching vapor from accumulator 27. Assuming that the temperature of the lean oil flowing to absorber 11 decreases, analyzer-recorder-controller 38 would then manipulate temperature-recorder-controller 39 to hold the heating value of the combined residual gaseous stream constant. Obviously, the conventional outlined control loop will be quite slow in reacting due to the dynamics of the process it is controlling. It would then be necessary to operate at a higher heating value level than otherwise necessary to permit an adequate margin of safety. It is undesirable, but necessary, when operating a conventional feedback control system to permit the heating value to vary widely from the desired control level.

Conventionally, the capacity of a natural gasoline recovery process is limited by the capacity of the absorption step. Therefore, any adjustment made in the flow of residue gas from absorber 11 in order to produce a desired combined residual gas having a desired heating value should be limited. As it is conventional to operate the absorber or absorbers so as to recover maximum product, it is desirable to operate with a maximum lean oil flow for the maximum period of time. If the flow of lean oil to the absorber was adjusted in a conventional feedback control method by analyzing the combined residual gaseous stream, the last-named objective of operating the absorbed with maximum lean oil flow cannot be effectively maintained.

The inventive control system as hereinafter described provides a means of operating the absorption step at the maximum possible capacity while at the same time producing a combined residual gaseous stream having a constant heating value. Although the inventive control system as hereinafter discussed will be specifically applied to the production of a residual gaseous stream having a constant heating value, it is within the scope of this invention to apply the inventive control system to produce a residue gas of desired composition.

I have discovered an improved method of controlling the flow of residue gas in a natural gasoline recovery process wherein a change in the heating value of the residue gas flowing from absorber 11 is noted by analyzing means 17. A signal is transmitted from analyzing means 17 to a series of controls to adjust the flow of lean oil to absorber 11 in response to the determination of analyzing means 17. A continuous signal transmitted from analyzing means 17 is caused to decay by means of a shaped-pulse generator 19, thereby returning the rate of lean oil flow to the optimum level prior to a further change in the heating value of the residue gas from absorber 11 as noted by analyzing means 17. The control of the combined residual gaseous stream flowing in conduit 16 is completed by determining the heating value of the combined residual gaseous stream with analyzing means 37 and increasing or decreasing the flow of residue gas from accumulator 27 in response to said determination. The inventive control system thus provides a means for rapidly adjusting the natural gasoline recovery process in response to a change occurring in the absorption or stabilizing steps to produce a combined residual gaseous stream of constant heating value.

It can readily be seen that the flow of residue gas from accumulator 27 can also be adjusted to produce a combined residual gaseous stream of constant heating value with a change in the heating value of a third feed stream past to conduit 16 via conduit 40 and noted by analyzing means 37. With the possible occurrence of rapid changes in the absorption step as occasioned by a change in the lean oil temperature, raw gaseous feed temperature, or raw gaseous feed flow rate, for example, the inventive control system will act to control the heating value of the absorber residual gaseous stream in such a manner that the change in the heating value of the residual gaseous stream flowing from absorber 11 will occur slowly. This permits analyzer-recorder-controller 38 the time necessary to finally control the heating value of the combined residual gaseous stream by adjusting the flow of the residue gas from accumulator 27.

The shaped-pulse generator 19 transmits a signal initially undisturbed from analyzer 17 to flow-recorder-controller 20. Thereafter, shaped-pulse generator 19 causes the signal to fade, thus causing flow-recorder-controller 20 to return valve 13 to the normal operating position employed prior to a subsequent change in the residue gas. The normal operating position is the position of valve 13 prior to the initial change in the residue gas heating value from absorber 11 detected by analyzing means 17. A shaped-pulse generator thus operates so that as each signal representative of a heating value change is applied to the input of the shaped-pulse generator, the output of the shaped-pulse generator will respond by first transmitting a signal representative of the heating value change. This output signal is maintained for a desired period of time and then permitted to return back to the original value that existed before the input signal to the shaped-pulse generator was changed. This permits the actual change in the heating value content of the residual gas flowing from the absorber 11 to occur slowly.

In order to more fully explain the operation of the shaped-pulse generator, reference is made to FIGURE 4. The circuit illustrated in FIGURE 4 can, for example, be employed to yield a square-pulse signal for a step signal input as illustrated by FIGURES 7a and 7b, where C is $e^{-St}$, a transfer function in the LaPlace domain of pure dead time or transport delay; $S_i(A)$ is an input signal; $S_0$ is an output signal; $t$ is time; $S$ is the LaPlace operator. The overall transfer function for the circuit of FIGURE 4 can be written as:

$$\frac{S_0}{S_i} = (1 - e^{-St})$$

If the block shown in FIGURE 4, for example, has a transfer function of G, G being the transfer function of a first order lag, a response to a step input signal can be graphically illustrated by FIGURES 8a and 8b, where FIGURE 8a represents the input to the summing junction D and FIGURE 8b represents the output pulse. The overall transfer function for the circuit of FIGURE 4 then becomes:

$$\frac{S_0}{S_i} = 1 - G = 1 - \frac{1}{T_1 S + 1} = \frac{T_1 S}{T_1 S + 1}$$

where $T_1$ is the time constant of the first order lag.

If the C block shown in FIGURE 4 has a transfer function of $Ge^{-St}$, where G is the transfer function of a third order lag and $e^{-St}$ is again pure dead time, the response to a step signal input will be as illustrated by FIGURE 9. FIGURE 9 represents the theoretical response desired. This control system, however, is difficult to obtain in a practical matter because of the process dead time. For this reason an approximation of pure dead time is employed. Dead time can be approximated with the transfer function:

$$-\left(\frac{T_2 S - 1}{T_2 S + 1}\right)$$

where $T_2$ is the time constant of the first order lag in the above approximation. This is known as a first order dead time approximation. A control system with this transfer function will act as pure dead time within certain frequency limitations. These limitations are set by:

$$Wt = 0.6$$

where W is the frequency in radians/minute and $t$ is the desired dead time in minutes.

Thus, if it is desired to have a six minute dead time, a frequency of 0.1 radian per minute cannot be exceeded. At the maximum allowable frequency for a given dead time, there will be an error of one degree in the theoretical phase shift for pure dead time. If the allowable frequency is exceeded, the phase shift error will exceed one degree. When the study of a process indicates that certain frequencies cannot be passed, then it is possible to employ dead time approximation to advantage.

I have discovered a method of and apparatus for pneumatically simulating a first order dead time approximation with a transfer function of:

$$-\left(\frac{T_2 S - 1}{T_2 S + 1}\right)$$

Referring to FIGURE 5a, there is illustrated a circuit capable of simulating a first order dead time approximation pneumatically. An input pneumatic signal $S_i$ is transmitted via conduit 53 to a conventional pneumatic computing relay, such as a Foxboro M56-1 adding relay illustrated in Technical Information Bulletin 37-A-57A distributed by Foxboro Company, Foxboro, Massachusetts, said computing relay capable of solving the following equation:

$$\text{Output} = -g(C) + B$$

where g is the adjustable gain of the computing relay; C and B are input variables. Input signal $S_i$ is also transmitted to computing relay 50 via conduit 54 and restriction means 51. In the derivation of the transfer function for the pneumatic circuit of FIGURE 5a, the following equations can be written:

$$B = \frac{S_i}{T_2 S + 1} \qquad C = S_i$$

where $T_2$ is the time constant and is equal to the resistance times the capacitance. In the derivation of pressure B, it is noted that the rate of change of pressure B with respect to time is proportional to the net flow of gas into or out of the volume downstream of the restriction means, and is inversely proportional to the volume capacitance C (lbs./p.s.i.). Therefore:

$$\frac{dB}{dt} = \frac{W_1}{C}$$

where $W_1$ = flow of gas (lbs./sec.). The flow of gas through the restriction means is proportional to the pressure drop ($S_i - B$) and inversely proportional to the resistance value R (p.s.i./lb./sec.). Therefore:

$$W_1 = \frac{S_i - B}{R}$$

Substituting this expression into the first equation to eliminate $W_1$ there is obtained:

$$\frac{dB}{dt} = \frac{S_i - B}{RC}$$

where RC is the time constant $T_2$ $$\frac{dB}{dt} = \frac{S_i - B}{T_2}$$

Using operation notation, substitute S for $d/dt$ to obtain:

$$BS = \frac{S_i - B}{T_2} \text{ or } B = \frac{S_i}{T_2 S + 1}$$

The resistance is determined by measuring the pressure drop across restriction means or restrictor 51 and dividing said pressure drop by the quantity of flow through said restrictor 51, and the capacitance is the change in quantity per unit change in pressure in bellows B. Substituting in the equation for computing relay 50, there is obtained:

$$S_0 = -\frac{S_i}{2} + \frac{S_i}{T_2S+1}$$

The transfer function for the pneumatic circuit of FIGURE 5a then becomes:

$$\frac{S_0}{S_i} = \frac{-T_2S-1+2}{2(T_2S+1)} = -\frac{1}{2}\left(\frac{T_2S-1}{T_2S+1}\right)$$

This, as previously noted, is the proper form of the desired transfer function for a circuit simulating a first order approximation of process dead time. It is noted that the steady state gain of the pneumatic computing relay is one-half. However, this is not important so long as the form is correct.

I have discovered a method of and apparatus for pneumatically obtaining a shaped-pulse generator. Referring to FIGURE 6a, there is shown two pneumatic computing relays, 60 and 72, such as the Foxboro M56–1 adding relay illustrated in Technical Information Bulletin 37-A-57A distributed by Foxboro Company, Foxboro, Massachusetts. Each of the said relays is capable of solving the following equation:

$$\text{Output} = g(A - C) + B$$

where $g$ is the adjustable gain of the relay; A, B, and C are input variables. A input of relay 60 is not employed. Relay 60 must then be capable of solving the equation:

$$\text{Output} = g(-C) + B$$

An input pneumatic signal $S_i$ is transmitted to computing relay 72 by means of a conduit 61. Input signal $S_i$ is also transmitted to computing relay 60 via conduits 68 and 69 passing through restriction means 62, volume 63, restriction means 64, volume 65, restriction means 66, and volume 67. In addition thereto, the pneumatic signal passing as an input B to computing relay 60 passes through restriction means 70. Computing relay 60 transmits a signal via conduit 73 to computing relay 72 as an input variable B. As previously noted, computing relay 60 and restriction means 70 constitute a means of providing a first order dead time approximation.

Restriction means 62, 64, 66, and volume means 63, 65 and 67 will have the response of a third order exponential lag. Assuming that the third order lag portion of the pneumatic circuit has a transfer function G and incorporating the transfer function of the pneumatic circuit of FIGURE 5a, the following equations can be written for computing relay 60:

$$B = \frac{S_i G}{TS+1}$$
$$C = S_i G$$
$$g = \frac{1}{2}$$

By substituting these values into the general equation for computing relay 60, the following equation is obtained:

$$S_n = \frac{S_i G}{TS+1} - \frac{S_i G}{2}$$

The following equations can be written for computing relay 72:

$A=$ Bias pressure set to operate pulse at desired level $$B = S_n = \frac{S_i G}{TS+1} - \frac{S_i G}{2}$$
$$C = S_i$$

The above values can be substituted into the equation for computing relay 72 to obtain:

$$S_0 = \left(\frac{S_i G}{TS+1} - \frac{S_i G}{2}\right) - \frac{1}{2}S_i$$
$$\frac{S_0}{S_i} = \frac{1}{2}\left[G\left(-\frac{TS-1}{TS+1}\right) - 1\right]$$

where $g$ equals one-half. The pneumatic circuit of FIGURE 6a with the above transfer function will respond to a signal step input change as illustrated by FIGURE 9.

The shape of the decay in the output signal is dependent upon the third order exponential lag. It is, of course, within the scope of this invention to employ other type lags, depending upon the dynamics of the controlled process. For example, the arrangement of restriction means 62, 64, 66 and volume 63, 65 and 67 result in what is convenientally known as a third order interacting exponential lag. These can, if the process dictates, be second order, fourth order, etc. Non-interacting lags can also be utilized. For a non-interacting lag, each individual lag element (restriction means 62 and volume 63 constitute a single lag) can be isolated with a conventional isolation relay.

Referring to FIGURE 5b, there is illustrated another circuit capable of simulating a first order dead time approximation pneumatically. An input pneumatic signal $S_i$ is transmitted via conduit 80 to a conventional pneumatic computing relay, such as the Foxboro M56–1 adding relay capable of solving the following equation:

$$\text{Output} = A - C + B$$

where A, C, and B are input variables. Input signals $S_i$ is also transmitted to computing relay 81 via conduit 82, restriction means 83, and conduits 84 (input variable B) and 85 (input variable A). An output signal is transmitted from computing relay 81 via conduit 86. In the derivation of the transfer function for the pneumatic circuit of FIGURE 5b, the following equations can be written:

$$A = B = \frac{S_i}{T_2S+1}$$
$$C = S_i$$

Substituting in the equation for the computing relay 81 there is obtained:

$$S_0 = \frac{S_i}{T_2S+1} - S_i + \frac{S_i}{T_2S+1}$$

The transfer function for the pneumatic circuit of FIGURE 5b then becomes:

$$\frac{S_0}{S_i} = -\frac{T_2S-1}{T_2S+1}$$

The above is the first order dead time approximation exactly of the same form as that obtained by the circuit of FIGURE 5a with the exception that the circuit of FIGURE 5b does not have a steady state gain of one-half. When employing the pneumatic circuit of FIGURE 5b, the shaped-pulse generator will appear as illustrated in FIGURE 6b.

Referring to FIGURE 6b, there is shown two pneumatic relays, 90 and 91. Each of said computing relays is capable of solving the following equation:

$$\text{Output} = A - C + B$$

where A, B, and C are input variables. An input pneumatic signal $S_i$ is transmitted to computing relay 91 by means of conduit 92.

Input signal $S_i$ is also transmitted to computing relay 90 via conduit 93, restriction means 94, volume 95, restriction means 96, volume 97, restriction means 98, and volume 99 as an input variable C. In addition thereto, input signal $S_i$ is also transmitted to computing relay 90 via conduit 100, restriction means 101 and conduit 102 as input variable B and as input variable A via conduit 103. An output pneumatic signal $S_n$ is transmitted from computing relay 90 via conduit 104 to computing relay 91 as an input variable A. An output signal is transmitted from computing relay 91 via conduit 105.

Restriction means 94, 96, 98, and volume means 95, 97, and 99 will have the response of a third order exponential lag. If, as in the case of FIGURE 6a, it is assumed that the third order lag portion of the pneumatic circuit has a transfer function G, and incorporating the transfer function of a pneumatic circuit of FIGURE 5b, the following equations can be written for computing relay 90:

$$A = B = \frac{S_i G}{TS+1}$$

$$C = S_i G$$

Substituting the above values into a general equation for computing relay 90, the following equation is obtained:

$$S_n = \frac{S_i G}{TS+1} - S_i G + \frac{S_i G}{TS+1}$$

The following equation can be written for computing relay 91:

$$B = \text{Bias pressure}$$

$$A = S_n = \frac{S_i G}{TS+1} - S_i G + \frac{S_i G}{TS+1}$$

$$C = S_i$$

Substituting the above values into the equation for relay 91, there is obtained:

$$S_0 = \frac{S_i G}{TS+1} - S_i G + \frac{S_i G}{TS+1} - S_i$$

$$\frac{S_0}{S_i} = G\left(-\frac{TS-1}{TS+1}\right) - 1$$

The pneumatic circuit of FIGURE 6b, with the above transfer function will respond to a signal step input change as illustrated by FIGURE 9.

FIGURE 6b will provide the same desired pulse shape as FIGURE 6a with the exception that FIGURE 6b does not have a gain of one-half. For either the circuit of FIGURE 6a or FIGURE 6b, the fixed bias adjustment of relays 72 and 91, respectively, sets the level about which the pulse system operates.

Referring to FIGURE 2, there is illustrated another embodiment of the inventive control method. Control of the absorber 11 can be conducted on a feed-forward basis, the remainder of the control system is as illustrated in FIGURE 1. The temperature and rate of flow of the lean oil feed, and the temperature and rate of flow of the natural gas raw feed can be measured and the results transmitted to a computer 46. An empirical equation can be developed which relates the fuel feed gas flow, feed gas temperature, lean oil flow and lean oil temperature to the absorber 11 residue gas composition or heating value. Central computer 46 can then be employed to provide a continuous computed value of the composition of the residue gas as an input signal into shaped-pulse generator 19. By predicting the composition or heating value of the residue gas in this manner, and by opening or closing valve 13 in response to said prediction, a more rapid control response is obtained.

The empirical equation for computer 46 can be written as:

$$Y = aT_G + bT_L + cF_G - dF_L + K$$

where $Y$ = Heating value of residue gas
$T_G$ = Temperature of raw feed
$T_L$ = Temperature of lean oil
$F_G$ = Rate of flow of raw feed
$F_L$ = Rate of flow of lean oil
$K$ = Constant
$a$, $b$, $c$ and $d$ are constants, each representative of the rate of change of Y with changes in $T_G$, $T_L$, $F_G$, and $F_L$, respectively.

Although the equation has been written so as to determine the heating value of the residue, it can also be employed to determine the concentration of a particular residue gas constituent. For example, if it is desired to absorb $C_4$'s and heavier hydrocarbons in an absorption zone, the above equation can be employed to determine the concentration (Y) of $C_4$'s in the residue gas.

As the rate of change of Y with respect to changes in $t_L$ is not linear; the above equation becomes:

$$Y = aT_G + (eT_L - f)T_L + cF_G - dF_L + K$$

where $e$ and $f$ are constants determined empirically.

A computer capable of solving the above equation is illustrated in FIGURE 10. Referring to FIGURE 10, the temperature $t_L$ of the lean oil feed to the absorber is measured by a temperature sensing means not herein illustrated. A signal representative of said temperature measurement is transmitted by transmitter 110 via conduit 111 to a means 112 of squaring an input variable. If, for example, the temperature sensing means employed is a thermocouple, and squaring means 112 is a pneumatic instrument, transmitter 110 can be any commercially available instrument which will transpose an electrical input signal into a pneumatic output signal such as a Minneapolis Honeywell Electrik Tel-O-Set MV/P transmitter described in Minneapolis Honeywell Catalog FS1003–2a.

Squaring means 112 is an instrument capable of squaring an input variable and multiplying the result obtained by a constant. An instrument capable of performing this function is the Sorteberg force bridge described by Minneapolis-Honeywell Regulator Company, Philadelphia, Pennsylvania in Catalog C80-1 dated December, 1958. A signal is transmitted from squarer 112 to a totalizer 114 via conduit means 113.

A signal representative of said temperature measurement is also transmitted via conduits 111 and 115 to a totalizer 114 as input C, said totalizer capable of solving the equation:

$$\text{Output} = A - C + B$$

where A, B and C are variable inputs of the totalizer. As previously noted, an instrument capable of performing this operation is the Foxboro M56-1 adding relay.

As in the case of the lean oil temperature, the temperature $t_G$ of the raw natural gaseous feed is measured and a signal representative of said temperature measurement is transmitted by a conventional transmitter 116 via conduit means 117 to totalizer 114 as variable input A. Totalizer 114 transmits a signal via conduit means 123 to a totalizer 122 as input B. Totalizer 122 is an instrument capable of performing the same function as totalizer 114.

A flow sensing means such as an orifice across which a pressure differential is developed is placed in the conduit through which the lean oil is passed to the absorber. A differential pressure representative of the rate of flow squared is transmitted by a conventional differential pressure transmitter 118 to a square root extractor 120 via conduit 119. Square root extractor 120 is commercially available instrument capable of extracting the square root of an input variable, multiplying the result obtained by a constant and transmitting the result to totalizer 122 as input C via conduit means 121.

In the same manner the rate of flow of the raw natural gaseous feed to the absorber is determined and a differential pressure representative of the square of the rate of flow is transmitted by a differential pressure transmitter 124 to square root extractor 126 via conduit 125. Square root extractor 126 must be capable of performing the same function as square root extractor 120 and transmitting a resulting signal to totalizer 122 as an input A via conduit means 127.

Totalizer 122 thus will transmit a signal via conduit means 128 which is representative of the predictive composition or heating value of the absorber residue gas. It is within the scope of this invention to employ a conventional electronic computer to perform the functions of computer 46 of FIGURE 2 in the inventive control system.

Assuming that the maximum changes in the feed gas temperature and flow are slow and are of such a quantity as to cause only a slow deviation in the residual gas composition, another embodiment of the inventive control method is available. The lean oil flow can then be manipulated as a function of the lean oil temperature in a predictive manner as illustrated in FIGURE 3. A signal is transmitted to a multiplier 47, said signal proportional to the lean oil temperature. Multiplier 47 multiplies the temperature of the lean oil feed by a constant (K) so that the output of multiplier 47 is of appropriate magnitude to supply an input to pulse generator 19. The lean oil flow must be adjusted to compensate for a change in the lean oil temperature. The signal is transmitted from multiplier 47 to shaped-pulse generator 19, and from shaped-pulse generator 19 in the manner heretofore described.

In order to demonstrate operating features of the inventive control system, the following examples are presented as illustrative.

*Example I*

The inventive control method illustrated by FIGURE 2 was employed to control the heating value of the residue gas flowing from absorber 11. The raw natural gas feed to absorber 11 was of the following composition:

| | Mol percent |
|---|---|
| Nitrogen | 15.16 |
| Methane | 72.06 |
| Ethane | 6.12 |
| Propane | 4.12 |
| Butanes | 1.70 |
| Pentanes | .56 |
| Hexane | .28 |

The lean oil feed to absorber 11 was comprised of mineral seal oil. The lean oil was passed to absorber 11 at a temperature of 70° F. and at a rate of 2,500,000 gallons per day. The raw natural gas feed was passed to absorber 11 at a temperature of 72.5° F. and at the rate of 360,000,000 cubic feet per day.

The previously determined empirical equation developed for absorber 11 was:

$$Y - 963.05 = 0.4287\ T_G + (0.009313\ T_L - 1.069)\ T_L + 0.1077(10)^{-6}\ F_G - 0.1313(10)^{-4}\ F_L$$

where $Y$ = heating value of residue gas in B.t.u. per cubic foot
$T_G$ = temperature of feed gas, ° F.
$T_L$ = temperature of lean oil, ° F.
$F_G$ = flow of feed gas, cubic ft./day
$F_L$ = flow of lean oil, gal./day Computer 46 was set to solve the above equation, transmitting a pneumatic signal to the shaped-pulse generator in the heretofore described manner. Absorber 11 was controlled to produce a residue gas of constant B.t.u. content of 971 B.t.u./ft.³. The effectiveness of this control method was demonstrated in that the B.t.u. content of the residue gas deviated less than ½ B.t.u./ft.³ from the control point of 971 B.t.u./ft.³ even though servere transients affected the absorber.

*Example II*

The function of the shaped-pulse generator 19 of FIGURE 1 is illustrated by passing a natural gas feed to absorber 11, said natural gas feed having the same composition as in Example I. The residue gas flowing from absorber 11 is of the following composition:

| | Mol percent |
|---|---|
| Nitrogen | 15.45 |
| Methane | 73.45 |
| Ethane | 6.24 |
| Propane | 3.82 |
| Butanes | 1.02 |
| Pentanes | .02 |

A chromatographic analyzer 17 determines the concentration of propane in the residue and transmits a 9 p.s.i.g. pneumatic pressure representative of this concentration to shaped-pulse generator 19. Shaped-pulse generator in turn transmits a 15 p.s.i.g. pneumatic pressure to so position valve 13 to permit maximum lean oil (mineral seal oil) flow to absorber 11. The temperature of the lean oil is 70° F.

A sudden decrease in the temperature of the lean oil to 60° F. reduces the concentration of propane in the residue gas flowing from absorber 11. This change is noted by chromatographic analyzer 17. Analyzer 17 transmits a signal less than 9 p.s.i.g. to shaped-pulse generator 19 which in turn transmits a signal to valve 13 thus reducing the flow of lean oil to absorber 11. After a period of 35 minutes the rate of flow of lean oil to absorber 11 is returned to the maximum and analyzer 17 is transmitting a constant pnuematic pressure of 8 p.s.i.g. representative of a concentration of 2.82 mol percent of propane in the residue gas.

Operating in the above manner provides the necessary time (35 minutes) during which the flow of enriching gas from accumulator 27 can be increased to maintain a combined residue gas having the desired concentration of propane.

Operating without controlling the flow of lean oil to absorber 11 in the inventive manner results in the concentration of propane in the residue gas flow from absorber 11 leveling out at 2.82 mol percent after a period of 10 minutes, following the decrease in the lean oil temperature. The period of time in which an adjustment in the flow of enriching gas can be made is reduced thereby decreasing the effectiveness of the control system.

It is within the scope of this invention to electronically provide a shaped-pulse by conventional methods and to employ the electronically generated shaped pulse in the inventive control system.

It is within the scope of this invention to adjust two process variables in response to a measured process variable wherein the adjustment applied to one of the process variables is removed after a period of time with final control of the process residing in the adjustment of the second process variable in response to the measured variable. This method of control is particularly adapted to the control of processes wherein a rapid process response is obtained by an adjustment of the process variable from which the adjustment is removed after a period of time.

As will be evident to those skilled in the art, various modifications of this invention can be made, or followed, in the light of the foregoing disclosure and discussion without departing from the spirit or scope thereof.

I claim:

1. Apparatus comprising, in combination, a pneumatic computing means, first conduit means in communication with said pneumatic computing means for transmitting a pneumatic pressure C to said computing means, a restriction means, second conduit means communicating between said first conduit means and said restriction means, third conduit means communicating between said restriction means and said computing means for transmitting a pneumatic pressure B to said computing means, said computing means solving the equation $$\text{Output} = g(-C) + B$$

where $g$ is the adjustable gain of said computing means, and fourth conduit means in communication with said computing means for transmitting a pneumatic pressure representative of said Output from said computing means, said computing means and said restriction means having a transfer function equivalent to $$-\left(\frac{TS-1}{TS+1}\right)$$

where T is the time constant of a first order lag and S is the LaPlace operator.

2. Apparatus comprising, in combination, a pneumatic computing means, first conduit means in communication with said computing means for passing a pneumatic pressure C to said computing means, a restriction means, second conduit means communicating between said first conduit means and said restriction means, third conduit means communicating between said restriction means and said computing means for transmitting a pneumatic pressure B to said computing means, fourth conduit means communicating between said restriction means and said computing means for transmitting a pneumatic pressure A to said computing means, said computing means solving the equation $$\text{Output} = A - C + B$$

and fifth conduit means in communication with said computing means for transmitting a pneumatic pressure representative of said Output from said computing means, said computing means and said restriction means having a transfer function equivalent to $$-\left(\frac{TS-1}{TS+1}\right)$$

where T is the time constant of a first order lag and S is the LaPlace operator.

3. Apparatus comprising, in combination, a first pneumatic computing means, first conduit means communicating with said first computing means for transmitting a pneumatic pressure C to said first computing means, a lag means, second conduit means communicating between said first conduit means and said lag means, a second pneumatic computing means, third conduit means communicating between said lag means and said second computing means for transmitting a pneumatic pressure C' to said second computing means, a restriction means, fourth conduit means communicating between said lag means and said restriction means, fifth conduit means communicating between said restriction means and said second computing means for transmitting a pneumatic pressure B' to said second computing means, said second computing means solving the equation $$\text{Output}' = g'(-C') + B'$$

where $g'$ is the adjustable gain of said second computing means, sixth conduit means communicating between said second computing means and said first computing means for transmitting a pneumatic pressure B representative of said Output' to said first computing means, means for transmitting a bias pressure A to said first computing means, said first computing means solving the equation $$\text{Output} = g(A - C) + B$$

and seventh conduit means in communication with said first computing means for transmitting a pneumatic pressure representative of said Output from said first computing means.

4. Apparatus comprising, in combination, a first pneumatic computing means, first conduit means in communication with said first computing means for transmitting a pneumatic pressure C to said first computing means, a lag means, second conduit means communicating between said first conduit means and said lag means, a second pneumatic computing means, third conduit means communicating between said lag means and said second computing means for transmitting a pneumatic pressure C' to said second computing means, a restriction means, fourth conduit means communicating between said lag means and said restriction means, fifth conduit means communicating between said restriction means and said second computing means for transmitting a pneumatic pressure B' to said second computing means, sixth conduit means communicating between said restriction means and said second computing means for transmitting a pneumatic pressure A' to said second computing means, said second computing means capable of solving the equation $$\text{Output}' = A' - C' + B'$$

seventh conduit means communicating between said second computing means and said first computing means for transmitting a pneumatic pressure A representative of said Output' to said first computing means, means for transmitting a bias pressure B to said first computing means, said first computing means solving the equation $$\text{Output} = g(A - C) + B$$

where $g$ is equal to the adjustable gain of said first computing means, and eighth conduit means in communication with said first computing means for transmitting a pressure representative of said Output from said first computing means.

References Cited by the Examiner

UNITED STATES PATENTS

| | | | |
|---|---|---|---|
| 2,503,213 | 4/50 | Philbrick | 235—184 |
| 2,512,561 | 6/50 | Ziegler | 137—86 X |
| 2,541,277 | 2/51 | Omberg et al. | 235—151 |
| 2,677,385 | 5/54 | Markson | 137—86 |
| 2,737,964 | 3/56 | Olah | 137—86 |
| 2,829,322 | 4/58 | Silva | 235—151 |
| 2,902,644 | 9/59 | McDonald | 235—151 |
| 2,934,267 | 4/60 | Wirkler et al. | 235—151 |
| 2,960,268 | 11/60 | Chope et al. | 235—193 |
| 2,978,178 | 4/61 | Patterson | 235—193 |
| 3,011,709 | 12/61 | Jacoby | 235—151 |
| 3,059,846 | 10/62 | Vesper | 235—61 |
| 3,062,271 | 11/62 | Rijnsdorp | 235—61 |
| 3,126,904 | 3/64 | Ciarlariello | 137—85 |

FOREIGN PATENTS

| | | |
|---|---|---|
| 536,537 | 5/41 | Great Britain. |
| 860,485 | 2/61 | Great Britain. |

OTHER REFERENCES

"Dynamic Behavior of Pneumatic Devices" by Gould and Smith, I.S.A. Journal, June 1953, pages 62–67.

"An Analog for Process Lags" by Single, Control Engineering, October 1956, pages 113, 115.

Control Engineering, October 1954, pages 76, 77.

LEO SMILOW, *Primary Examiner.*
WALTER W. BURNS, JR., A. BERLIN, *Examiners.*